United States Patent [19]

Kornbrekke et al.

[11] Patent Number: 4,967,083
[45] Date of Patent: Oct. 30, 1990

[54] DOOR SENSOR SYSTEM

[75] Inventors: Henning N. Kornbrekke, Burlington; Leon Boiucaner, Farmington, both of Conn.

[73] Assignee: The Stanley Works, New Britain, Conn.

[21] Appl. No.: 337,944

[22] Filed: Apr. 14, 1989

[51] Int. Cl.$^5$ ............................................. E05F 15/20
[52] U.S. Cl. ................................... 250/341; 250/221; 49/25; 340/545
[58] Field of Search .................... 250/341, 221; 49/25; 340/545

[56] References Cited

U.S. PATENT DOCUMENTS

| | | | |
|---|---|---|---|
| 3,852,592 | 12/1974 | Scoville et al. | 250/221 |
| 4,577,437 | 3/1986 | Gionet et al. | 49/25 |
| 4,698,937 | 10/1987 | Kornbrekke et al. | 250/221 |
| 4,823,010 | 4/1989 | Kornbrekke et al. | 250/221 |
| 4,894,952 | 1/1990 | Trett et al. | 49/25 |

Primary Examiner—Janice A. Howell
Assistant Examiner—Richard Hanig
Attorney, Agent, or Firm—Chilton, Alix & Van Kirk

[57] ABSTRACT

A sensor system for an automatic sliding door employs multiple sensor modules. Each of the sensor modules includes both a presence sensor and a motion sensor. In addition, each of the sensor units includes switches for adjusting the size of the presence zone, for selecting either a continuous or a triggered scan mode and for selecting an operating phase to prevent interference. The sensor units are generally mounted above the threshold of the doorway and their opeations are synchronized to provide both a traffic sensor and a safety sensor for a sliding door system.

29 Claims, 7 Drawing Sheets

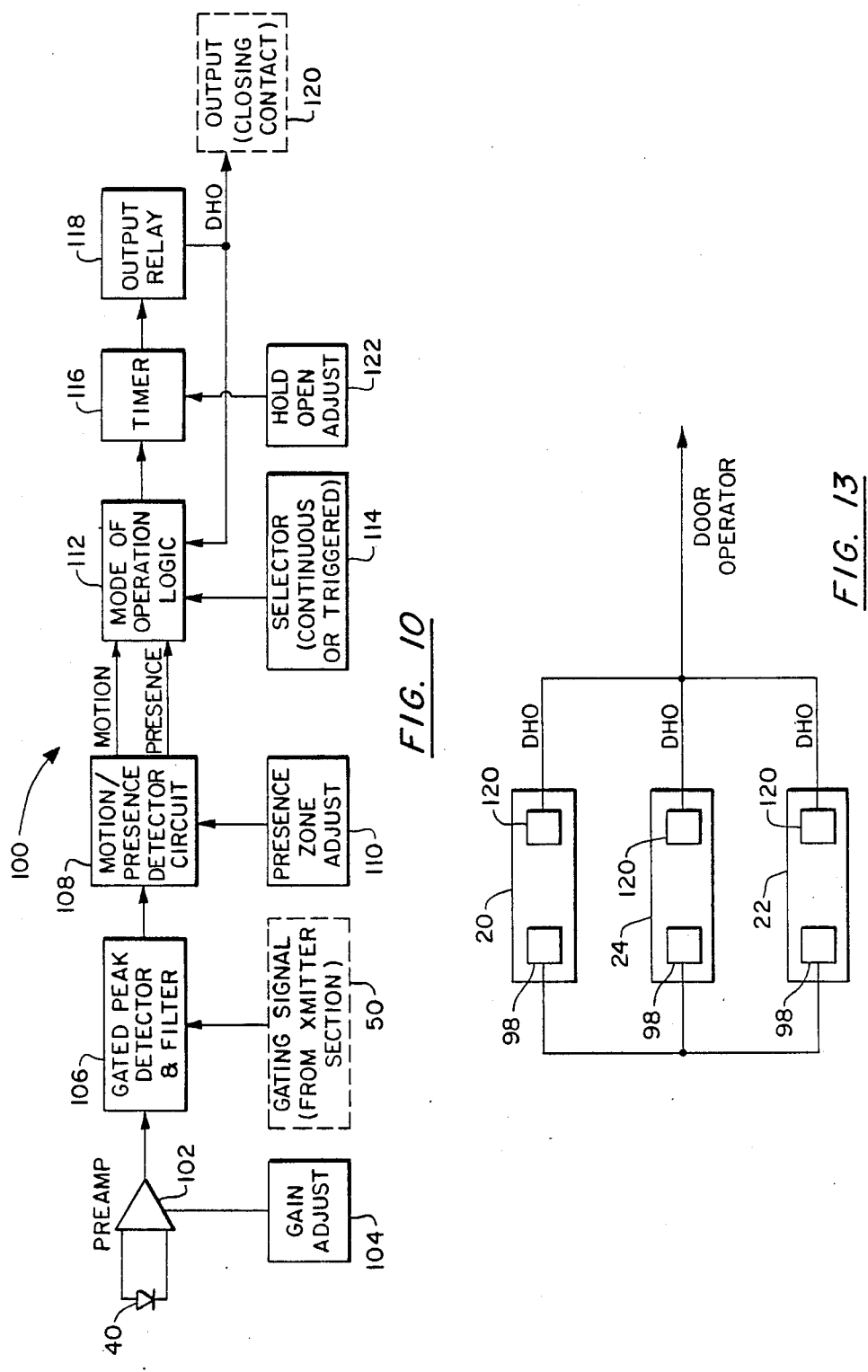

DOOR SENSOR SYSTEM

BACKGROUND OF THE INVENTION

This invention relates generally to sensor systems which are used to detect conditions for automatically opening a door. More particularly, the present invention relates generally to infra-red sensors employed in connection with controlling the operation of sliding door systems.

In sliding door sensor systems to which the invention relates, it is conventional to employ a traffic approach sensor unit on each side of the door as well as a safety sensor to monitor the area of the doorway threshold. Numerous types of systems have been advanced for use in the automatic opening and closing of doors. The traffic operate initiating function of the sensor system detects subjects approaching the doorway. The traffic sensor function normally involves the sensing of motion which may be accomplished by active or passive infrared radiation or micro-wave radiation. The safety function of the sensor system normally involves the detection of the presence of a subject or foreign object within an immediate area of the threshold. Conventional presence detectors may employ infra-red radiation through beam, diffuse reflective infra-red radiation or ultrasound as detection media.

The electronic sensor technology is sufficiently advanced that motion sensor units are generally reliable in sensing the intrusion of a foreign object into the detection zone of a doorway while disregarding stationary objects in the zone. Nevertheless, false sensor readings do occur. A primary aim of all door sensor systems is reliability and safety. Consequently, safety sensor units are frequently employed in combination with traffic sensors to enhance safety. Conventional safety sensor units while generally providing adequate sensing capabilities, may occasionally exhibit operational deficiencies. Sensor units which employ an infra-red through beam ordinarily only cover a very narrow zone in front of the door threshold. The cooperative use of a motion sensor with an infra-red through beam may result in situations wherein an individual in the immediate vicinity or partially within a door threshold zone is not sensed, and the door is automatically allowed to close.

Because of the narrow zone limitations of infra-red through beam radiation, at least one safety sensor employs a diffuse reflective infra-red type sensor which is mounted above the door. The overhead door safety sensor ordinarily covers a larger detection zone than safety sensors mounted at other positions. However, the larger detection zone may also require processing logic which will compensate for the moving door panels so that a closing door will not reactivate or be sensed by the safety sensor. In addition, reactivation of the safety device may require triggering by the operate motion sensors which may not sense slow moving individuals under certain conditions - even when the individuals are relatively close to the door.

In U.S. patent application Ser. No. 048,634 filed on May 11, 1987 now U.S. Pat. No. 4,823,010 and assigned to the assignee of the present invention, a sliding door threshold sensor employs a plurality of infra-red transmitters. The transmitters emit infra-red radiation so as to define a detection zone which substantially encompasses the region above the threshold and the threshold vicinity at opposing sides of the threshold. The detection signal is processed for determining whether a foreign object is present in the detection zone. The processor logic includes means for compensating for the moving sliding doors. The transmitters and sensor circuitry is housed in a housing which is mounted above the threshold of the sliding door with four infra-red transmitters being employed to define overlapping regions of the detection zone.

SUMMARY OF THE INVENTION

Briefly stated, the invention in a preferred form is a sensor system for an automatic door system which comprises a plurality of substantially identical sensor units connected together in modular fashion. The sensor system has particular applicability in connection with sliding door systems wherein each of the sensor units is mounted generally above the door threshold. Each of the sensor units comprises a transmitter for emitting infrared radiation to define a detection zone and a receiver for receiving reflected radiation from the detection zone. Detection logic circuitry detects the presence of an object in a presence zone and the motion of an object in a motion zone and generates a composite detection signal indicative of the detection. A door hold open signal is generated for a pre-established time interval. The sensor units are efficiently synchronized for coordinated operation. The sensor units are mounted so that at least a pair of the presence zones intersect.

The transmitter preferably comprises an array of light emitting diodes which are oriented at distinct directional angles. The diodes are sequentially pulsed. The sensor units may have a modular construction including separate housings. An optical barrier is interposed between the receiver and the infra-red emitters to prevent direct impingement of radiation from the emitters. Each of the sensor units comprises a switch for selectively varying the expanse of the presence zone. The door hold open output signals from the sensor units are connected in parallel. Each of the sensor units have a phase switch for selectively setting the phase interval of the pulsing of the transmitters for each of the units to prevent inter-unit interference.

The presence signal lasts for approximately the time during which the object is sensed in the detection zone. The motion signal lasts for a pre-established time which increases as the object approaches closer to the sensor. The detection output signal which represents the sum of the motion and presence signals is routed via a hold timer. The hold timer actuates an output relay as long as the composite motion/presence signal is present at the timer input. When the timer input signal ceases, the timer will generate an output which allows the output relay to be reset after an additional adjustable hold open time delay.

A selector switch is provided for selecting either a continuous mode or a trigger mode of operation for each of the sensor units. The trigger mode of operation is responsive to a trigger input for selectively controlling the transmission of the hold open output signal. The trigger input signal for one unit may be responsive to the hold open output signal of another sensor unit.

An object of the invention is to provide a new and improved sensor system employing two or more sensor units each of which is capable of both traffic and safety detection functions.

Another object of the invention is to provide a new and improved sensor system of modular form comprising infra-red sensor units adapted for use as both a motion and a presence detector and for either continuous scanning or trigger detection modes.

A further object of the invention is to provide a new and improved sensor system for a sliding door system which reliably detects both motion and presence throughout a detection zone in the vicinity of the door threshold.

Other objects and advantages of the invention will become apparent from the drawings and the specification.

BRIEF DESCRIPTION OF THE DRAWINGS

FIG. 10 is a block diagram of an infra-red receiver and detector for a sensor unit of the sensor system of FIG. 1;

FIG. 13 is a schematic block diagram of the sensor system of FIG. 1.

DETAILED DESCRIPTION OF THE INVENTION

Figure 1:
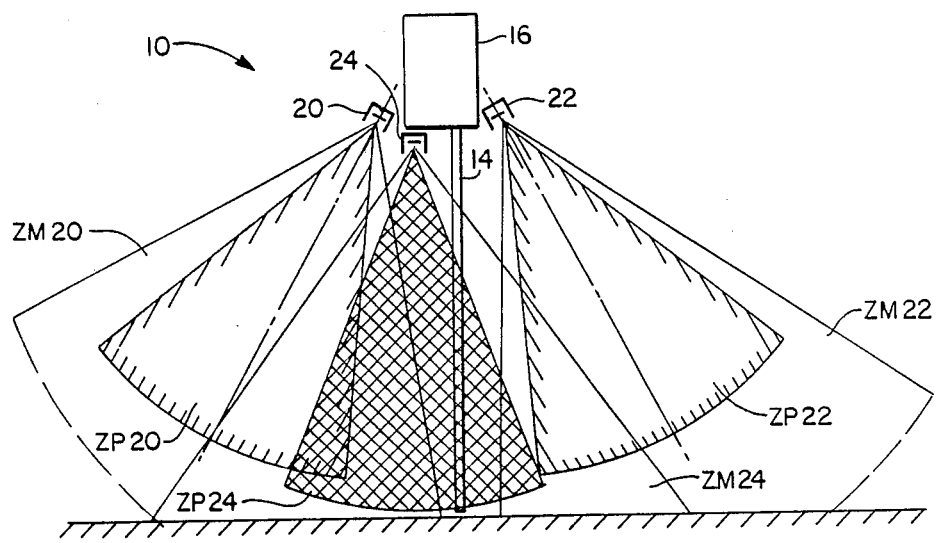
FIG. 1 is a schematic side view of a doorway and a door sensor system in accordance with the present invention illustrating various detection zones of the sensor system.
Figure 8:
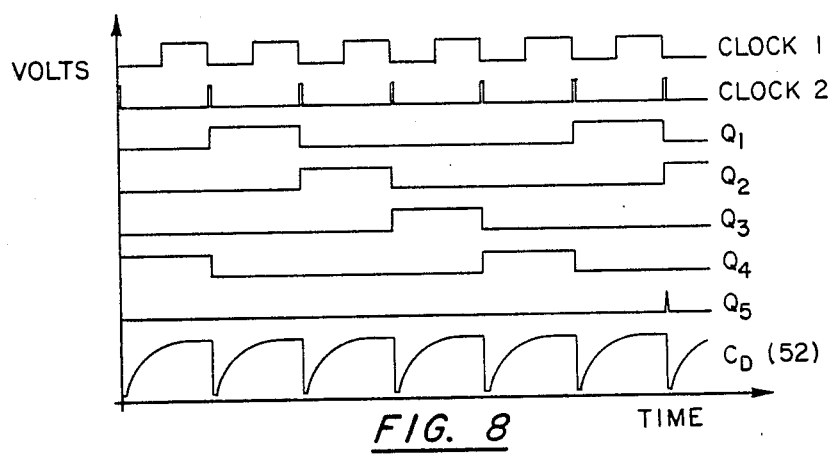
FIG. 8 is a graph illustrating signal wave shapes for various components of the transmitter of FIG. 7.

With reference to the drawings wherein like numerals represent like parts throughout the figures, a universal sensor system in accordance with the present invention is generally designated by the numeral 10. Sensor system 10 is adapted for use with a sliding door system 12 to provide a sensory input for automatically opening and closing sliding doors 14 of the sliding door system. The header 16 of the sliding door system which is disposed above the threshold 18 may also function as a housing and/or a support and mounting structure for the sensor system 10.

The sensor system 10 comprises three sensor units 20, 22, and 24 which are substantially identical in type and construction. The sensor units combine in modular fashion to provide the sensory input to the sensor system. Each of the sensor units is adapted to function as both a motion sensor and a presence sensor. In addition, the mode of operation for each of the units can be selected to be either a continuous scan mode or a triggered mode, as will be described in detail below.

As best illustrated in FIG. 1, sensor unit 20 is a traffic operate sensor which is adapted to provide a sensory input relative to sensing approaching traffic from one side (entrance) of the door. Traffic sensor unit 22 is adapted to provide an approaching sensor input from the opposing side (exit) of the door. Safety sensor unit 24 is a threshold sensor which is adapted to provide a sensory input relative to traffic at/or in the vicinity of the door threshold 18.

Figure 6:
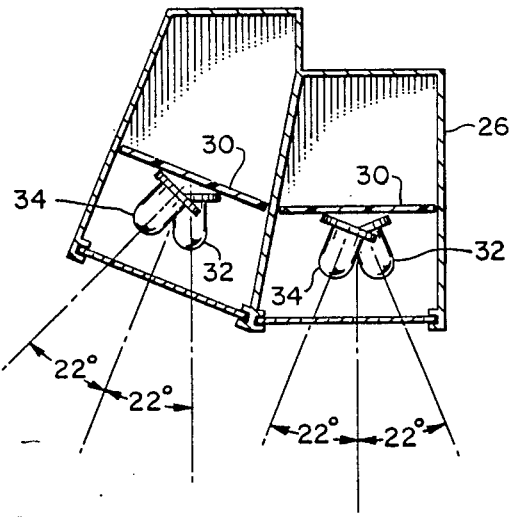
FIG. 6 is an enlarged fragmentary cross-sectional view, partly in diagrammatic form, of an alternate embodiment of a sensor unit in accordance with the present invention.

Each of the sensor units may have a separate housing module which is mounted to the header 16. The housing modules may be directionally adjustable. Alternatively, two or more of the sensor units may be housed within an integrated extruded housing 26 such as illustrated in FIG. 6. Each of the sensor units have substantially identical capabilities and can function as either a traffic operate or a safety device. In this regard, each of the sensor units may operate as both a motion sensor and a presence sensor. The sensor units function by transmitting infra-red pulses toward predetermined zones. The reflected infra-red pulses are received and electronically processed to form the door hold open (DHO) sensor input to the automatic door system. The DHO signals from each of the sensor units may be connected in parallel to provide the input signal to the door operator as illustrated in FIG. 13.

Figure 4:
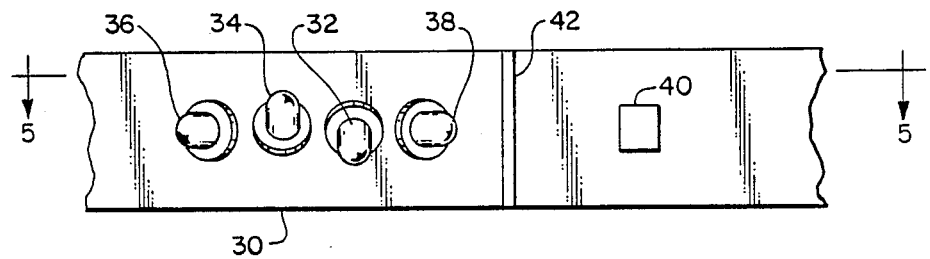
FIG. 4 is an enlarged fragmentary interior view of a sensor unit of the door sensor system of FIG. 1.
Figure 5:
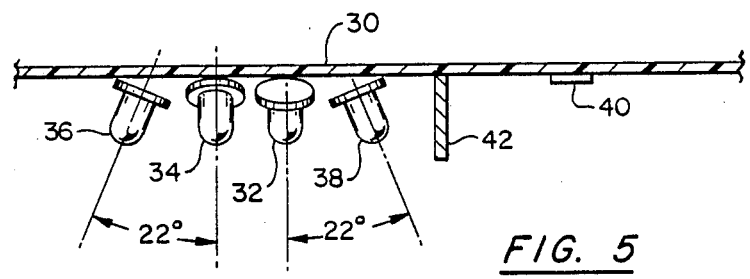
FIG. 5 is an enlarged fragmentary sectional view, partly in diagrammatic form, of the sensor unit of FIG. 4 taken along the line 5—5 thereof.

With reference to FIGS. 4 and 5, each of the sensor units comprises a circuit board 30 which mounts four infra-red LEDs 32, 34, 36, and 38. The LEDs are oriented at pre-selected directional axes to define an IR illumination zone. The 22° angular relationships of the directional axes of FIGS. 5 and 6 provide efficient zone coverage. An infra-red PIN detector diode 40 is mounted to the circuit board for receiving reflected infra-red energy from the illumination zone. An optical barrier 42 is preferably interposed between the LEDs and the PIN diode 40 to prevent direct radiation impinging on the receiving diode 40.

Figure 2:
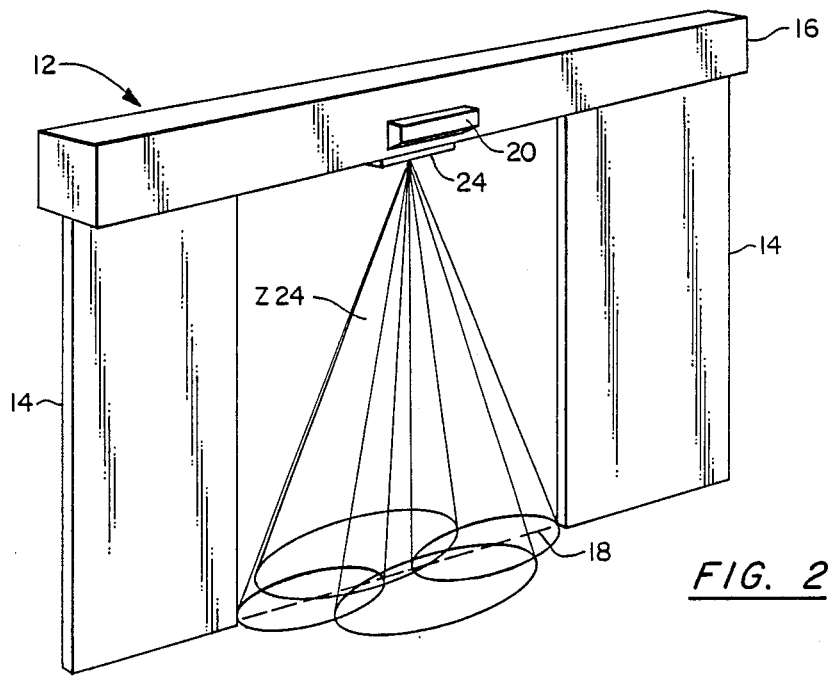
FIG. 2 is a frontal perspective view, partly in schematic, of the sensor system and a sliding door system illustrating the illumination patterns of a safety sensor unit.
Figure 3:
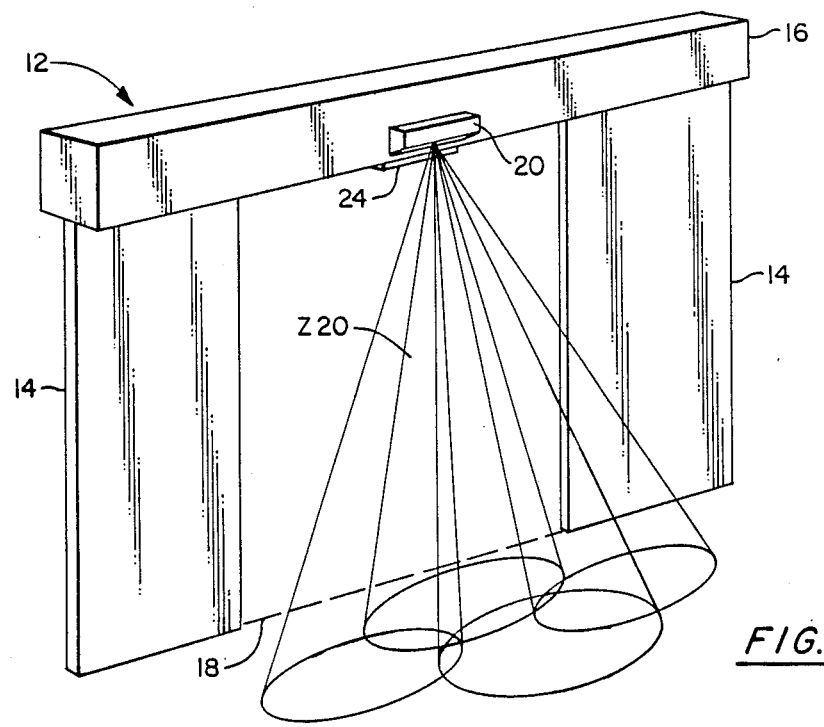
FIG. 3 is a frontal perspective view, partly in schematic, of the sensor system and a sliding door system illustrating the illumination patterns of a traffic sensor unit.

As best illustrated in FIG. 3, the IR LEDs of traffic sensor 20 define an IR illumination or detection zone Z20 which is in front of the doorway. The four LEDs of the safety sensor unit 24 define an illumination or detection zone Z24 as illustrated in FIG. 2. Zone Z24 is directed toward the door threshold and the region in the close vicinity thereof. The IR LEDs of traffic sensor unit 22 define an illumination or detection zone Z22 (not illustrated). It should be appreciated that zone Z22 is similar to zone Z20, except for its directional position and orientation at the rear approach to the entranceway.

The PIN detector diodes 40 are wide angle receiving diodes which define the apices of the detection zones for each of the sensor units as illustrated in FIG. 1. Each of the sensors comprise substantially identical electronic logic circuitry which electronically defines a presence zone and a motion zone for each of the sensor units. The motion detection zone for traffic sensor 20 is designated as ZM20 and the presence detection zone for sensor unit 20 is designated ZP20 in FIG. 1. Likewise, the motion detection zone for traffic sensor 22 and the presence detection zone for traffic sensor 22 are designated as ZM22 and ZP22, respectively. The motion detection zone and the presence detection zone for safety sensor 24 are designated as ZM24 and ZP24, respectively.

The expanses of presence zones ZP20, ZP22 and ZP24 are adjustable in each of the sensor units. The sensor units are mounted in such a manner that the presence zones ZP20, ZP22 and ZP24 overlap to form a composite presence zone which substantially encompasses the threshold 18 and the vicinity of the threshold of the doorway. The overlapping of the presence zones ensures that an appropriate sensor input will be generated for the automatic door system—even in the event of a fully stationary subject in close proximity to the door threshold 18. The composite presence zone is limited to the close vicinity of the door threshold. At a given distance beyond the door threshold, only motion detection will be operable, and stationary objects will essentially be disregarded as a sensory activator for the sensor system.

Figure 7:
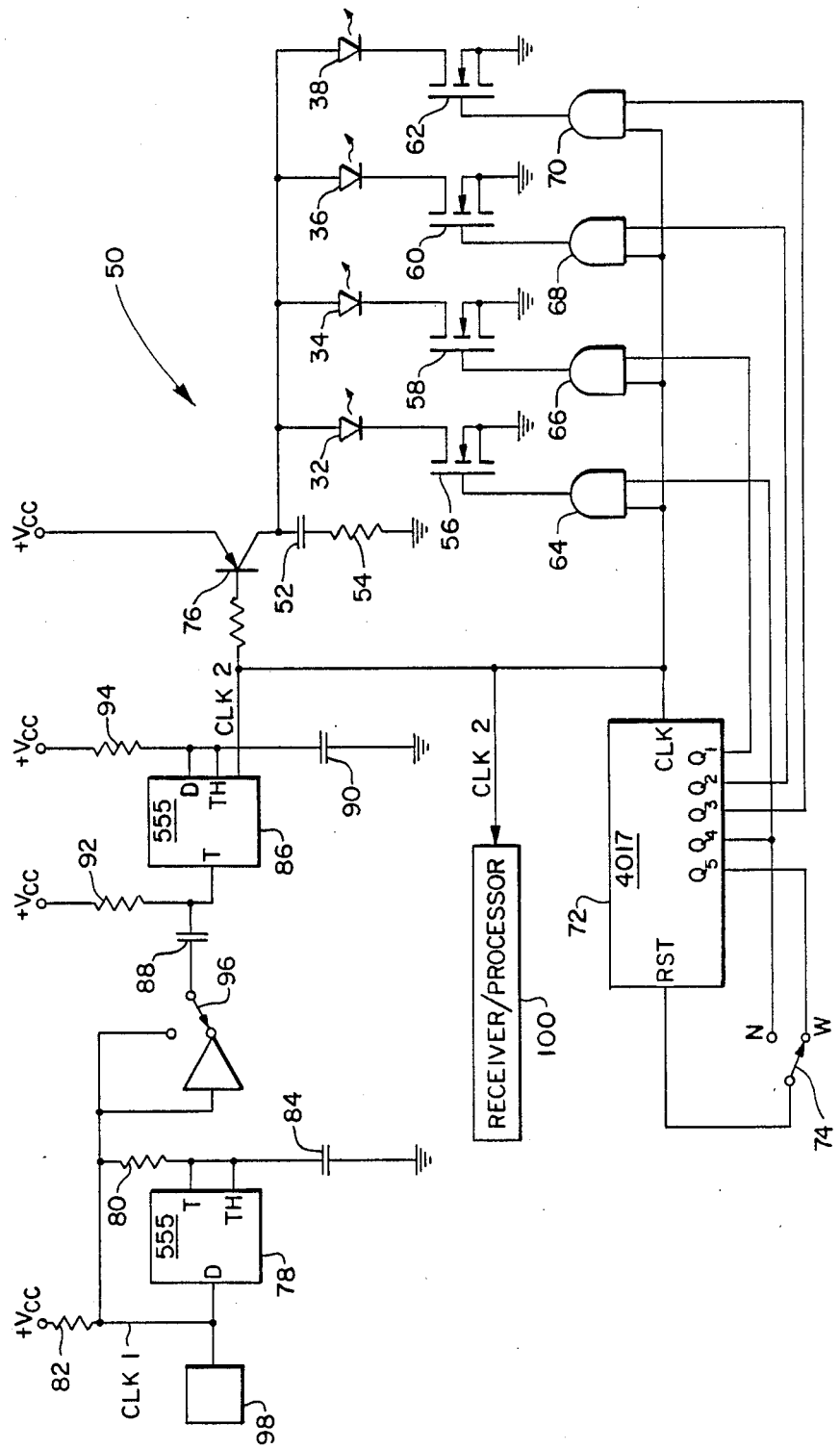
FIG. 7 is a simplified schematic diagram of an infra-red transmitter employed in the sensor system of FIG. 1.

With reference to FIG. 7, the IR transmitter circuit is generally designated by the numeral 50. The IR LEDs 32, 34, 36 and 38 are sequentially pulsed by discharging capacitor 52 through the respective diodes via a limiting resistor 54 and one of the power FET drivers 56, 58, 60 and 62. AND gates 64, 66, 68 and 70 control the respective drivers 56, 58, 60 and 62. A decoded decade counter 72, which may be a type 4017 counter, includes a ring counter which selects the diode to be pulsed.

A selector switch 74 is employed to select either Q5 or Q3 outputs of the counter to reset the counter and restart a cycle. The selector switch 74 has a wide (W) and a narrow (N) setting for adjusting the illumination pattern so that, for example, the sensor units may be employed with narrow door openings, as well as standard dimensioned door openings. In the disclosed embodiment when the selector switch 74 is set at the narrow mode, only LEDs 32 and 34 are energized.

Figure 9:
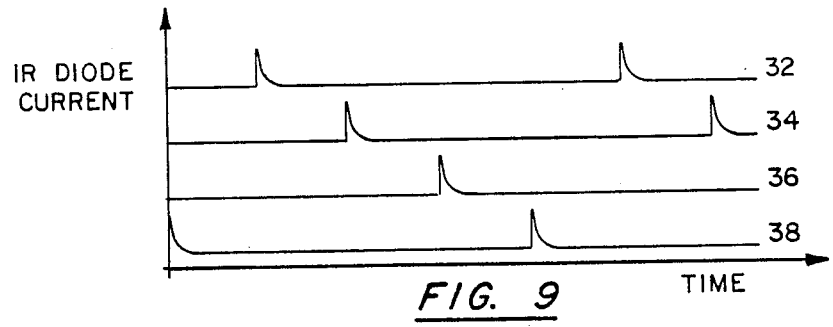
FIG. 9 is a graph illustrating current wave shapes for infra-red diodes in the transmitter of FIG. 7.

A clock 1 (CLK 1) square wave is generated by a 555-type timer 78, resistors 80 and 82 and a capacitor 84. A clock 2 (CLK 2) signal controls the charging transistor 76 which recharges the capacitor 52 at each clock cycle. A dwell monostable circuit comprising a 555-type timer 86, capacitors 88 and 90, and resistors 92 and 94 produces the CLK 2 signal. A time duration of approximately 10 microseconds is required to effectively discharge the capacitor 52 and create a high current pulse to the IR LEDs 32, 34, 36 and 38. The current pulses are illustrated in FIG. 9. Typically, the peak current pulses two amps for a power supply voltage of ten volts.

The dwell monostable circuit is operated by the primary CLK 1 signal. A selector switch 96 enables the operation on either the positive or negative transition of the CLK 1 square wave signal. A terminal 98 is employed for synchronization of the multiple sensor units for a given door installation in order to avoid unwanted interference. By connecting all of the clocks in the system by a parallel connection of the corresponding synchronization terminals, the faster clock prevails and all functions within the system are synchronized. The selector switch 96 is employed to select different clock transitions to thereby pulse the IR LEDs in adjacent sensors so that inter-sensor unit interference is avoided. The CLK 2 signal also constitutes a gating signal to the receiver/processor 100.

With reference to FIG. 10, the receiver/processor 100 for each sensor unit may be substantially identical. The output from PIN diode 40 is applied to a preamplifier 102 having a gain adjustment 104. The amplified signal is then applied to a gated peak detector and filter circuit 106. The peak detector output from circuit 106 is then applied to a motion/presence detector circuit 108. A potentiometer 110 provides an input to circuit 108 to adjust the dimensions of the presence zone. The detector circuit 108 outputs logic motion and presence signals to a logic operation mode circuit 112. A mode selector switch 114 provides an input to the logic circuit 112 for selecting either a continuous or a triggered sensory mode. The triggered mode compensates for the sliding door movement across the threshold. The output from the logic mode circuit 112 is applied to a hold timer 116, which in turn actuates the output relay 118. The output DHO signal is the closing contact 120 of the relay. A hold-open adjust selector 122 is provided for adjusting the time of the applied output signal. A feedback from the output contact 120 to the logic mode circuit 112 provides a trigger signal for the logic circuit when the triggered mode is selected.

The reflected IR pulses are received by the PIN diode 40 and amplified in the pulse pre-amplifier 102. The CLK 2 gating signal from the transmitter circuit 50 is applied to the gated peak detector and filter circuit 106. The circuit 106 converts the input pulses to a filtered DC voltage which is proportional to the momentary level of illumination received by the diode 40. The gating signal allows the passage of a signal to the peak detector circuit 106 only during the short time intervals that the transmitting diodes 32, 34, 36 and 38 are pulsed. Signals received by the diode 40 which are not within the pulsing time interval, including interference signals, will thus be disregarded in the processor logic.

Figure 11:
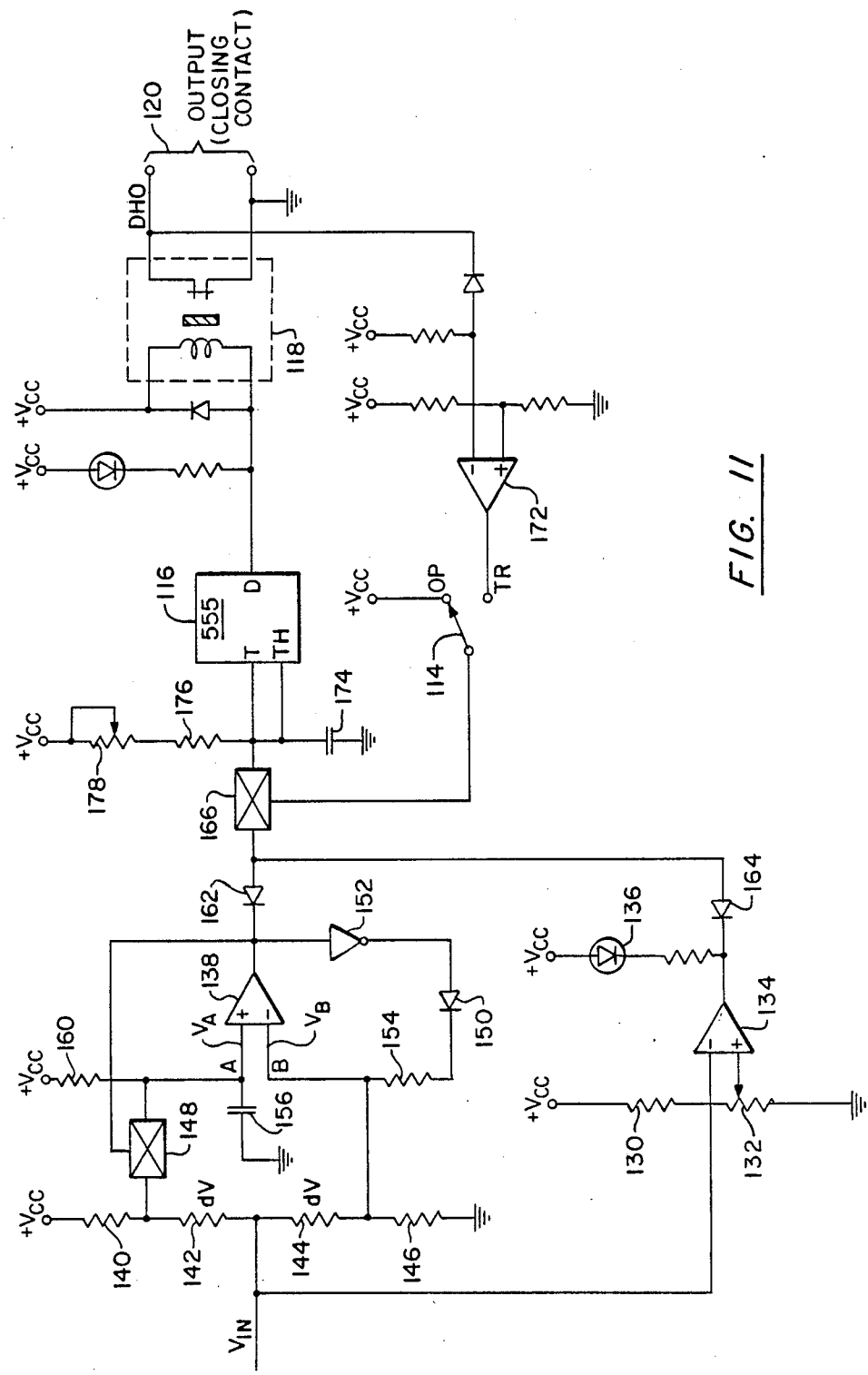
FIG. 11 is a simplified schematic diagram of the processor circuitry of a sensor unit of the sensor system of FIG. 1.
Figure 12:
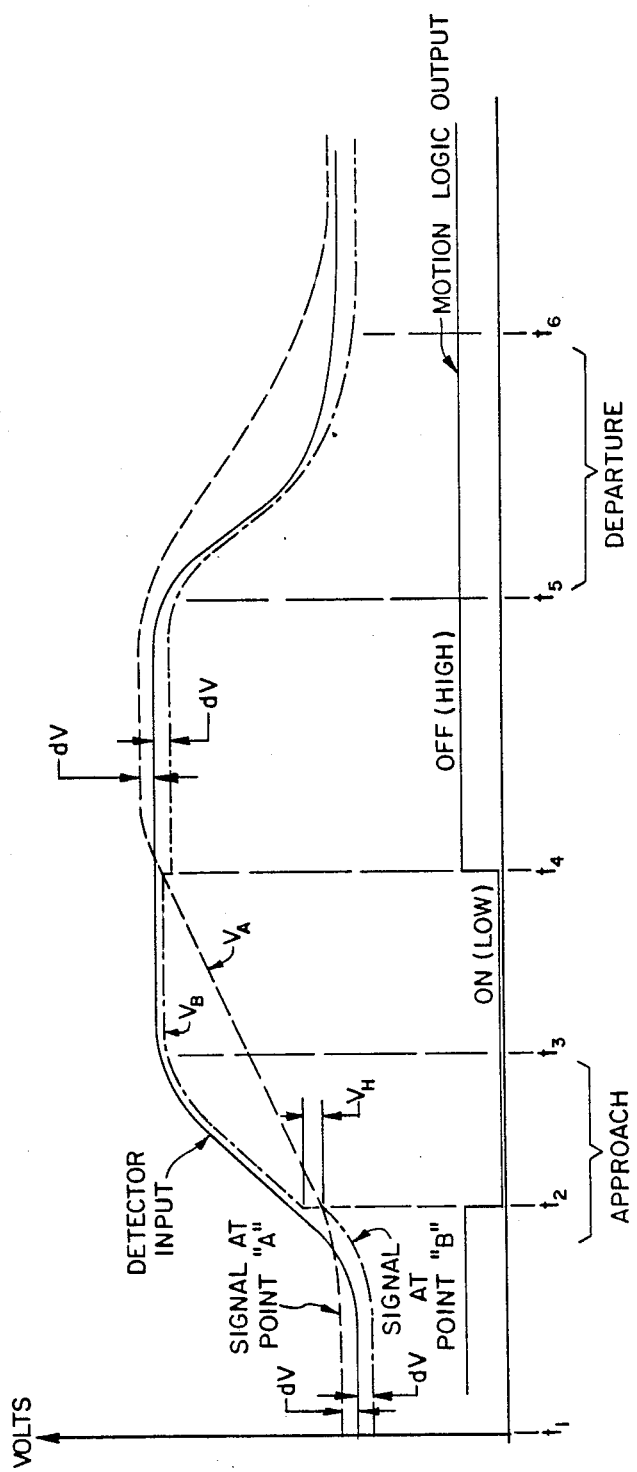
FIG. 12 is a graph illustrating the voltage versus time for various signals of the processor circuitry of FIG. 11.

With reference to FIGS. 11 and 12, the DC voltage $V_{IN}$ at the output of the peak detector filter circuit 106, which represents the average energy level of the reflected infra-red radiation sensed by the receiver, is processed to separate circuits. An adjustable reference signal, which is derived from a divider comprising a resistor 130 and a potentiometer 132, is applied to a voltage comparator 134. The $V_{IN}$ voltage is compared with the adjustable reference signal to generate a presence logic output signal. An indicator light 136 monitors the presence logic signal.

The motion detector circuitry of the sensor comprises a voltage comparator 138. Comparator 138 detects the variation in time t of the $V_{IN}$ voltage. A bias voltage dV is derived from a divider circuit comprising resistors 140, 142, 144 and 146 to make the voltage at circuit point A greater than the voltage at circuit point B. In a steady state condition wherein there is no motion, the $V_{IN}$ voltage is constant and the output from comparator 138 is at a high state. An analog switch 148 is conducting during the steady state since a high level is present at its control input. A diode 150 has its anode in a low state established by the reverse action of an inverter 152, so that the diode will not conduct and no current will flow through resistor 154. The foregoing described state of the logic circuit corresponds to the time $t_1$ in FIG. 12.

When the $V_{IN}$ voltage increases, such as, for example, between times $t_1$ and $t_2$, the voltage $V_A$ will lag voltage $V_B$ due to the presence of the capacitor 156. At time $t_2$, the $V_B$ voltage will slightly exceed the $V_A$ voltage, and the comparator 138 will change the output from a high state to a low state. The $V_B$ voltage will be slightly increased by a small hysteresis voltage $V_H$ via the circuit comprising resistor 154 and diode 150. The anode of diode 150 is changed to a high state by the inverter 152. The analog switch 148 is now turned off by the low state at its control input.

The capacitor 156 now is subject to only a charge current from the power supply via resistor 160. This current is maintained at a low value thereby resulting in a gradually increasing voltage $V_A$. This state continues between times $t_2$ and $t_4$ while the motion detection circuit logic output is low, indicating an "on" or a hold-open condition to the sensor output. At time $t_3$, a new steady state level is attained by the $V_{IN}$ voltage. At time $t_4$, the voltage $V_A$ reaches the $V_B$ voltage, to thereby turn the comparator 138 from the low state to the high state. An "off" signal is therefore generated.

The "on" signal resulting from an increase of the level of the input signal corresponds to motion of a subject approaching the sensor. After a given time wherein the motion stops (time $t_3$), the "on" signal is cancelled. It should be appreciated that the closer the subject moves to the sensor, the greater the voltage increment which will be observed between times $t_1$ and $t_3$, and consequently, a longer a hold-open time will be generated by the motion detection circuit.

In the event that a subject departs the detection zone, the $V_{IN}$ voltage will tend to decrease, such as between times $t_5$ and $t_6$. In such event, no change in the state of the comparator 138 will occur. Therefore, the circuitry exhibits directionality by reacting to the approaching motion only. If the movement changes from an approaching direction to a departure while the output is in an "on" state, a quick reversal to an "off" state is implemented.

The two logic signals produced by the motion and presence detection circuitry are summed in the OR circuit comprising diodes 162 and 164. The summed signal passes through a solid state switch 166 to actuate the output relay 118 via the timer circuit which comprises 555-type timer 116.

When the mode selector switch 114 is in the continuous operation mode, the switch is kept in a permanent conducting state by application of a high signal on its control input. With the selector mode switch 172 in a trigger mode (TR), the state of the signal transmitting switch 166 will depend on the state of comparator 172 which is monitoring conditions at the output of the sensor. Thus, the switch 166 will provide a transmission of a motion and/or a presence signal only when a closed contact is a detected at its input. The contact may be either the sensor itself or any contact wired in parallel, such as the output of another sensor unit used as a traffic operate device as illustrated in FIG. 13.

In the event that there is no "on" signal present at either of the diodes 162 and 164, and the timer 116 is in an "off" state, the relay 118 will remain energized and the normally closed output contact will be open. If no other parallel contact is closed, the comparator 172 will set the control input of the switch 114 low, and no signal can be transmitted to start the timer 116 from either the motion or the presence logic circuit. In this latter state, switch 114 can only be enabled by an external contact closure. When an external contact closure occurs, the switch 114 is enabled and any signals from the motion and presence detectors will be allowed to pass through the switch 166 to the timer 170. Low state signals on the diodes 162 and 164 will discharge the timing capacitor 174 and set the timer 116 output to a high state to thereby de-energize the output relay 118.

The relay output contact is normally a closed contact. The normally closed contact provides a fail-safe feature. In the event that the power supply to the sensor is disconnected, the de-energized relay signal will send a hold open signal to the door operator to thereby signal an operational problem within the sensor system.

In order that the sensor unit will go to an "off" state to thereby allow a door closing, the following conditions must be satisfied:
 a. No external operate signals are present.
 b. No internally generated "on" signals are present.
 c. Sufficient time has elapsed since the absence of internally generated "on" signals to allow for the timer capacitor 174 to recharge via resistors 176 and 178 to reset the output of the timer 116 to a high state corresponding to an open contact at the sensor output.

The operation of a sensor unit in a triggered mode can be advantageously employed as a threshold safety sensor. The safety sensor can be combined with a traffic operate sensor operating in a continuous scan mode so that only the traffic sensor working in a continuous mode will initiate a door opening and trigger the safety sensor. Both the traffic and safety sensors must be off to allow the doors to close. The circuitry monitors the sensor output state and allows for simple parallel of a number of sensor units to thereby obviate extra wiring conventionally required for a triggering signal.

It will be appreciated that the foregoing described sensor system employs two or more of the sensor units to provide an active infra-red system having a number of features. Each of the individual sensor units are capable of both motion and presence detection and each of the units has a presence zone adjustment. Furthermore, each of the units may be employed in either a continuous or triggered mode of operation so that the same sensor unit can be employed for either a traffic operate or a safety function. The multiple sensor units may be easily interconnected by paralleling the outputs. The clock signals in the sensor units are all readily synchronized to thereby prevent interference. The narrow or wide detection zones are easily achievable by selecting a variable number of operating transmitters. Directional detection of approaching motion is also achieved so that the door hold-open time is increased as a subject approaches the sensor unit and is cancelled as the subject departs. The continuously operating presence zones of the traffic sensor units overlap with a safety sensor zone to thereby enhance the safety of the sensor system.

While a preferred embodiment of the invention has been set forth for purposes of illustration, the foregoing description should not be deemed a limitation of the invention herein. Accordingly, various modifications, adaptations, and alternatives may occur to one skilled in the art without departing from the spirit and the scope of the present invention.

What is claimed is:

1. A sensor system for an automatic door system comprising:
 a plurality of sensor units, each said sensor unit comprising:
 transmitter means for emitting infrared radiation so as to define a detection zone Zd;
 receiver means for receiving reflected radiation from zone Zd;
 presence zone means for defining a presence zone Zp in said zone Zd;
 motion zone means for defining a motion zone Zm in said zone Zd;

detection logic means responsive to said receiver means for detecting the presence of a foreign object in zone Zp and the motion of a foreign object in zone Zm and generating a detection signal indicative thereof;

hold open output means responsive to said detection output signal for generating a hold open output signal for a pre-established time interval;

synchronization means for synchronizing the operation of said sensor units; and mounting means for mounting said sensor units so that at least a pair of said zones Zp intersect.

2. The sensor system of claim 1 and further comprising housing means for housing said sensor units.

3. The sensor system of claim 2 and further comprising a sliding door system, including a pair of sliding doors moveable across a doorway and wherein said housing means is mounted generally above the doorway.

4. The sensor system of claim 1 wherein said transmitter means comprises an array of light emitting diodes, each said diode being oriented at a distinct directional angle.

5. The sensor system of claim 1 wherein each sensor unit further comprises means for pulsing said transmitter means.

6. The sensor system of claim 1 further comprising an infra-red receiver and an array of infra-red emitters and optical barrier means interposed between said receiver and emitters for preventing direct impingement of radiation from said emitters on said receiver.

7. The sensor system of claim 1 further comprising zone adjust means for selectively varying the dimensions of said presence zone Zp.

8. The sensor system of claim 1 comprising three sensor units and circuit means for connecting said hold open output signals in parallel.

9. The sensor system of claim 1 wherein each said sensor unit further comprises selector means for selecting either a continuous mode or a trigger mode of operation of said sensor unit, said trigger mode operation being responsive to a trigger input for selectively controlling the transmission of the hold open output signal.

10. The sensor system of claim 5 wherein said sensor units comprise pulse selector means for selectively setting the pulsing of said transmitter means of said sensor units at different phase intervals.

11. The sensor system of claim 1 wherein said output means further comprises a timer means and wherein said detection signal is applied to said timer means for generating a hold-open output signal for a pre-established time interval.

12. The sensor system of claim 11 further comprising means for increasing the time interval of the timer means as a subject approaches closer to the sensor units.

13. The sensor system of claim 11 wherein said detection logic means produces a presence signal and a motion signal, and said presence and motion signals are summed to provide said detection signal.

14. The sensor system of claim 13 wherein each said sensor unit further comprises mode selector means for selecting either a continuous mode or a trigger mode of operation, said mode selector means controlling the transmission of said detection signal to said hold open means.

15. The sensor system of claim 14 wherein said trigger mode of operation is responsive to a trigger input signal, said input signal being responsive to the hold open output signal of another sensor unit.

16. The sensor system of claim 1 further comprising parallel circuit means for connecting said hold open output signals in parallel.

17. The sensor system of claim 1 wherein said transmitter means further comprises an array of infra-red emitters and further comprising zone select means for varying the number of operable emitters.

18. A sensor system for a sliding door system comprising:

a plurality of sensor units, each said sensor unit comprising:

transmitter means comprising an array of emitters for emitting infrared radiation so as to define a detection zone Zd;

receiver means for receiving reflected radiation from zone Zd;

presence zone means for defining a presence zone Zp in said zone Zd;

motion zone means for defining a motion zone Zm in said zone Zd;

detection logic means responsive to said receiver means for detecting the presence of a foreign object in zone Zp and the motion of a foreign object in zone Zm and generating a detection signal indicative thereof;

hold open output means selectively responsive to said detection output signal for generating a hold open output signal; and selector means for selecting a continuous mode or trigger mode of operation of said sensor unit, said trigger mode operation being responsive to a trigger input for selectively controlling the transmission of the detection signal;

synchronization means for synchronizing the operation of said sensor units; and connector means comprising a parallel circuit for combining said hold open output signals.

19. The sensor system of claim 18 wherein said trigger input of one sensor unit is responsive to the hold open output signal of another sensor unit.

20. The sensor system of claim 18 wherein each said sensor unit comprises pulsing means for pulsing said emitters and pulse selector means for selectively setting the phase intervals of said pulsing means.

21. The sensor system of claim 18 further comprising means for selectively varying the number of operable emitters.

22. A sensor system for an automatic door system of a type wherein at least one sliding door is moveable across the threshold comprising:

a plurality of sensor units, each said sensor unit comprising:

transmitter means for emitting infrared radiation so as to define a detection zone Zd;

receiver means for receiving reflected radiation from zone Zd;

presence zone means for defining a presence zone Zp in said zone Zd;

motion zone means for defining a motion zone Zm in said zone Zd;

detection logic means responsive to said receiver means for detecting the presence of a foreign object in zone Zp and the motion of a foreign object in zone Zm and generating a detection signal indicative thereof;

hold open output means responsive to said detection output signal for generating a hold open output signal;

synchronization means for synchronizing the operation of said sensor units; and mounting means for mounting said sensor units generally above the threshold so that at least a pair of said zones Zp intersect.

23. The sensor system of claim 22 wherein said transmitter means comprises an array of light emitting diodes, each said diode being oriented at a distinct directional angle.

24. The sensor system of claim 1 further comprising an infra-red receiver and an array of infra-red emitters and optical barrier means interposed between said receiver and emitters for preventing direct impingement of radiation from said emitters on said receiver.

25. The sensor system of claim 22 wherein each said sensor unit further comprises presence zone adjustment means for varying the dimensions of said presence zone Zp.

26. The sensor system of claim 22 comprising three sensor units.

27. The sensor system of claim 22 comprising pulsing means for pulsing said transmitters and pulse selector means for selectively setting the pulsing of said transmitter means of said sensor units at different phase intervals.

28. The sensor system of claim 22 further comprising parallel circuit means for connecting said hold open output signals in parallel.

29. The sensor system of claim 22 wherein at least one sensor unit is operable in a continuous scan mode and at least one other sensor unit is operable in a trigger mode, said trigger mode being activated in response to the hold open output signal of continuous scan mode sensor unit.

* * * * *